United States Patent
Mattejat et al.

(10) Patent No.: US 7,261,965 B2
(45) Date of Patent: Aug. 28, 2007

(54) FUEL CELL MODULE

(75) Inventors: Arno Mattejat, Bubenreuth (DE); Igor Mehltretter, Buckenhof (DE); Johann Rothfischer, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 461 days.

(21) Appl. No.: 10/381,482

(22) PCT Filed: Sep. 14, 2001

(86) PCT No.: PCT/DE01/03542

§ 371 (c)(1),
(2), (4) Date: Mar. 26, 2003

(87) PCT Pub. No.: WO02/27836

PCT Pub. Date: Apr. 4, 2002

(65) Prior Publication Data

US 2004/0043275 A1    Mar. 4, 2004

(30) Foreign Application Priority Data

Sep. 26, 2000  (DE)  ................ 100 47 591

(51) Int. Cl.
*H01M 2/02* (2006.01)
(52) U.S. Cl. .................. 429/37; 429/34
(58) Field of Classification Search ............ 429/37
See application file for complete search history.

(56) References Cited

U.S. PATENT DOCUMENTS

| 3,622,035 | A | * | 11/1971 | Suter | 280/834 |
|---|---|---|---|---|---|
| 4,342,816 | A | * | 8/1982 | Kothmann et al. | 429/13 |
| 4,345,009 | A | * | 8/1982 | Fahle et al. | 429/37 |
| 4,849,308 | A | * | 7/1989 | Schmitten et al. | 429/37 |
| 5,376,473 | A | * | 12/1994 | Akagi | 429/34 |
| 5,750,278 | A | * | 5/1998 | Gillett et al. | 429/24 |
| 6,218,039 | B1 | * | 4/2001 | Mease et al. | 429/37 |
| 6,322,920 | B1 | * | 11/2001 | Tomson | 429/34 |
| 6,627,339 | B2 | * | 9/2003 | Haltiner, Jr. | 429/17 |
| 6,720,101 | B1 | * | 4/2004 | Dong et al. | 429/32 |
| 2002/0164514 | A1 | * | 11/2002 | Kelley et al. | 429/34 |

(Continued)

FOREIGN PATENT DOCUMENTS

| EP | 0771038 A1 | 5/1997 |
|---|---|---|
| JP | 63 098968 A | 4/1988 |

OTHER PUBLICATIONS

Tatsuto; "Fuel Cell"; Patent Abstracts of Japan; JP 2001126749; PD May 11, 2001.

(Continued)

*Primary Examiner*—Jonathan Crepeau
*Assistant Examiner*—Robert Hodge
(74) *Attorney, Agent, or Firm*—Harness, Dickey & Pierce, P.L.C.

(57) ABSTRACT

A fuel cell module includes a number of series-connected fuel cells forming a fuel cell stack. To reliably ensure that there is no risk of the fuel cell stack buckling, even where a comparatively large number of fuel cells are grouped to form a fuel cell stack, the fuel cell stack is surrounded by a stabilizing casing, at least in a middle area as seen in the longitudinal direction.

30 Claims, 2 Drawing Sheets

U.S. PATENT DOCUMENTS

2005/0158606 A1* 7/2005 Xia et al. .................... 429/34
2006/0024549 A1* 2/2006 Andreas-Schott et al. .... 429/34
2006/0046127 A1* 3/2006 Ishizuka et al. .............. 429/34
2007/0054172 A1* 3/2007 Ueda ........................... 429/34

OTHER PUBLICATIONS

Hiroshi; "Fuel Cell"; Patent Abstracts of Japan; JP 63098968; PD Apr. 30, 1988.

Teruhisa; "Polymer Electrolytic Fuel Cell and Clamping Method Thereof"; Patent Abstracts of Japan; JP 2001126750; PD May 11, 2001.

English Translation of International Preliminary Examination Report mailed on Jan. 4, 2007 for PCT/DE2001/003542.

* cited by examiner

FUEL CELL MODULE

This application is the national phase under 35 U.S.C. § 371 of PCT International Application No. PCT/DE01/03542 which has an International filing date of Sep. 14, 2001, which designated the United States of America and which claims priority on German Patent Application number DE 100 47 591.4 filed Sep. 26, 2000, the entire contents of which are hereby incorporated herein by reference.

FIELD OF THE INVENTION

The invention generally relates to a fuel cell module in which a number of fuel cells connected in series form a fuel cell stack.

BACKGROUND OF THE INVENTION

Fuel cells can be used for the environmentally friendly generation of electricity. This is because a process which substantially represents a reversal of electrolysis takes place in a fuel cell. For this purpose, in a fuel cell, a fuel which includes hydrogen is fed to an anode and an auxiliary substance which includes oxygen is fed to a cathode. The anode and cathode are electrically separated from one another by an electrolyte layer; although the electrolyte layer does allow ion exchange between the fuel and the oxygen, it otherwise ensures gas-type separation of fuel and auxiliary material.

On account of the ion exchange, hydrogen contained in the fuel can react with the oxygen to form water, during which process electrons accumulate at the fuel-side electrode, i.e. the anode, and electrons are depleted at the electrode on the auxiliary substance side, i.e. the cathode. Therefore, when the fuel cell is operating, a potential difference or voltage is built up between the anode and cathode. The electrolyte layer, which in the case of a high-temperature fuel cell may be designed as a solid ceramic electrolyte or in the case of a low-temperature fuel cell may be designed as a polymer membrane, therefore has the function of separating the reactants from one other, of transferring the charge in the form of ions and of preventing an electron short circuit.

On account of the electrochemical potentials of the substances which are usually used, in a fuel cell of this type, under normal operating conditions, an electrode voltage of approximately 0.6 to 1.0 V can be built up and maintained during operation. For technical applications, in which a significantly higher overall voltage may be required depending on the intended use or the planned load. Therefore, it is usual for a plurality of fuel cells to be connected electrically in series, in the form of a fuel cell stack, in such a way that the sum of the electrode voltages which are in each case supplied by the fuel cells corresponds to or exceeds the required total voltage.

Each of the fuel cells which are combined to form a fuel cell stack of this type is assigned, in the region of its electrode, a volume region to which the media required in each case, such as for example the fuel or the auxiliary material, can be fed. This volume region may, for example, be delimited by boundary surfaces which are counted as part of the fuel cell itself, the boundary surfaces between two adjacent fuel cells, in order to form a closed volume region, being sealed off from the outside by means of a seal arranged between them. Depending on the total voltage required, the number of fuel cells in a fuel cell stack of this type may, for example, be 50 or more.

To produce the required seal between adjacent fuel cells in terms of the supply and discharge of the media, such as fuel and auxiliary substance, it may be necessary to subject the fuel cell stack to a certain clamping or pressing in its longitudinal direction. This corresponds to a long-term compressive load acting on the fuel cell stack in its longitudinal direction. This ensures that, firstly each fuel cell remains in mechanical contact with the fuel cells adjoining it, and, secondly, particularly when seals made from elastic material are used between the fuel cells, the required sealing action is indeed achieved as a result of the pressure applied in the longitudinal direction.

However, with elongate structures, such as bars, towers or struts, according to the Euler or Tetmajer buckling conditions, such a compressive load may result in a tendency to buckle. In this context, the term buckling is to be understood in particular as meaning yielding of a central region of the elongate structure in a direction perpendicular to the longitudinal axis. This tendency to buckle is dependent to a considerable extent on the length of the structure in question.

Buckling of this nature which occurs in a fuel cell stack, as a result of some of the fuel cells being moved out of their desired position, would, however, have a highly adverse effect on or even completely negate the ability of the fuel cell stack to function. The number of fuel cells which can be connected to one another to form a fuel cell stack is therefore only limited, depending on the sealing system which is provided for the connection of adjacent fuel cells and the resulting clamping force required in the longitudinal direction of the fuel cell stack.

On the other hand, however, particularly when a fuel cell system is designed for applications with relatively high design voltages, it is possible to provide for a relatively high number of fuel cells, for example 70 or more, to be connected up. The possibility of combining any desired number of fuel cells to form a fuel cell stack therefore represents an important contribution to the flexibility available in designing a fuel cell module. In particular for flexibility reasons, it may be desirable for the fuel cells to be combined to form a fuel cell stack in a readily portable fuel cell module.

SUMMARY OF THE INVENTION

Therefore, an embodiment of the invention is based on an object of providing a fuel cell module in which, even when a relatively large number of fuels cells are combined to form a fuel cell stack, the risk of the fuel cell stack buckling is reliably avoided.

According to an embodiment of the invention, this object may be achieved by the fuel cell stack being surrounded by a stabilizing casing at least in a central region, as seen in its longitudinal direction.

An embodiment of the invention is based on the consideration that the undesirable tendency of the fuel cell stack to buckle, although it is on the one hand dependent on the number of the fuel cells which form the fuel cell stack, it is also, on the other hand, dependent on the characteristics of the mechanical contact between two adjacent fuel cells. For sufficient flexibility when designing a fuel cell module, however, the mechanical stability of the fuel cell stack should be provided independently of these two parameters. For this purpose, external stabilization of the fuel cell stack is provided.

To make it particularly simple and therefore advantageous to assemble, the stabilizing casing advantageously has a number of elements which are matched in a positively locking manner to the outer contour of the fuel cell stack.

In a further advantageous configuration, some or all of the elements are designed as angle bars which can be placed against an outer edge of the fuel cell stack. In an advantageous alternative configuration, some or all of the elements are designed as a U-shaped metal sheet which is extended in the longitudinal direction of the fuel cell stack and engages around the latter in cross section on one of its outer sides. A common feature of both configurations of the elements is that in cross section they have at least one angular region which is preferably of right-angled design.

This on the one hand ensures a basic strength or rigidity of the element with respect to twisting or torsion and, on the other hand, ensures a certain stability with respect to lateral loads or buckling. Therefore, a contribution is made to stabilizing the fuel cell stack with respect to buckling not only by the interaction of a plurality of the elements during the formation of the stabilizing casing but also simply by an individual element per se.

To form the stabilizing casing, in a further advantageous configuration each element is connected to the elements which adjoin it by use of a number of connecting elements. In this way, the elements can be designed, in a particularly material-saving form, as relatively narrow elements which, although they have the mechanical strength preventing buckling, cover only a relatively small part of the actual surface of the fuel cell stack. In this case, they can be assembled to form the stabilizing casing by use of the connecting elements which, depending on the particular design, only have to satisfy significantly lower materials requirements than the actual elements.

The connecting elements are expediently designed as tensioning struts or tensioning straps. With a design of this type, the connecting elements, in the assembled state, are substantially subject to tensile load, so that particularly appropriate materials can be used.

When fuel cells are connected up to form a fuel cell stack, voltage-carrying components or electrodes may be accessible in particular at the edge regions of the fuel cells. In order, nevertheless, to reliably rule out the risk of short circuits and a resultant failure of the fuel cell module even when it is used in the vicinity of exposed or grounded parts, each element is advantageously provided with a number of insulating elements on its side which faces the fuel cell stack. Therefore, depending on the design of the stabilizing casing, it may also be designed as an insulting sheath for the fuel cell stack. In any event, however, the insulating elements ensure that the elements of the stabilizing casing themselves are kept free from potential and therefore do not contribute to the risk of short circuits being formed.

The fuel cells which lie on the outer sides, as seen in the longitudinal direction of the fuel cell stack, i.e. the first and last fuel cells as seen in the stack direction, are advantageously each connected to a connection plate, which is also known as a terminal plate. The connection plates are preferably of metallic design and are used to supply and remove operating media and the operating current to and from the fuel cell. The connection plates are of sheet-like design, in order to ensure a correspondingly uniform introduction or removal of the operating current into and from the active region of the first and last fuel cells.

To make it possible to achieve a particularly mechanically stable configuration of the fuel cell module in a particularly compact arrangement, a number of tie rods are advantageously arranged on each connection plate. In a further advantageous configuration, the connection plates are clamped together in the longitudinal direction of the fuel cell stack via these tie rods by use of clamping devices engaging on the latter. In addition to producing a mechanically stable and therefore also readily portable unit, this makes it possible, in a particularly simple way, to maintain a desired axial pressure on each individual fuel cell, in particular to maintain the required leaktightness of the seals in the abovementioned way.

The advantages which are achieved by at least one embodiment of the invention reside, in particular, in the fact that the encasing of at least a central region of the fuel cell stack with a stabilizing casing ensures a particularly high stability with respect to lateral buckling even when components which are actually unsuitable in mechanical terms, such as for example the sealing elements in the fuel cell stack, are used. It is therefore possible to apply an axial pressure to the fuel cell stack in order to ensure a required leaktightness in the media spaces between the individual fuel cells without the operational reliability of the fuel cell module being adversely affected. The clamping of the fuel cell module in the axial direction, in particular the use of the tensioning means in combination with the tie rods arranged on the terminal plates, also makes it possible to provide a particularly compact and relatively easily portable fuel cell module.

BRIEF DESCRIPTION OF THE DRAWINGS

An exemplary embodiment of the invention is explained in more detail with reference the drawings, in which.

Identical parts are provided with identical reference numerals in both figures.

DETAILED DESCRIPTION OF THE PREFERRED EMBODIMENTS

Figure 1:
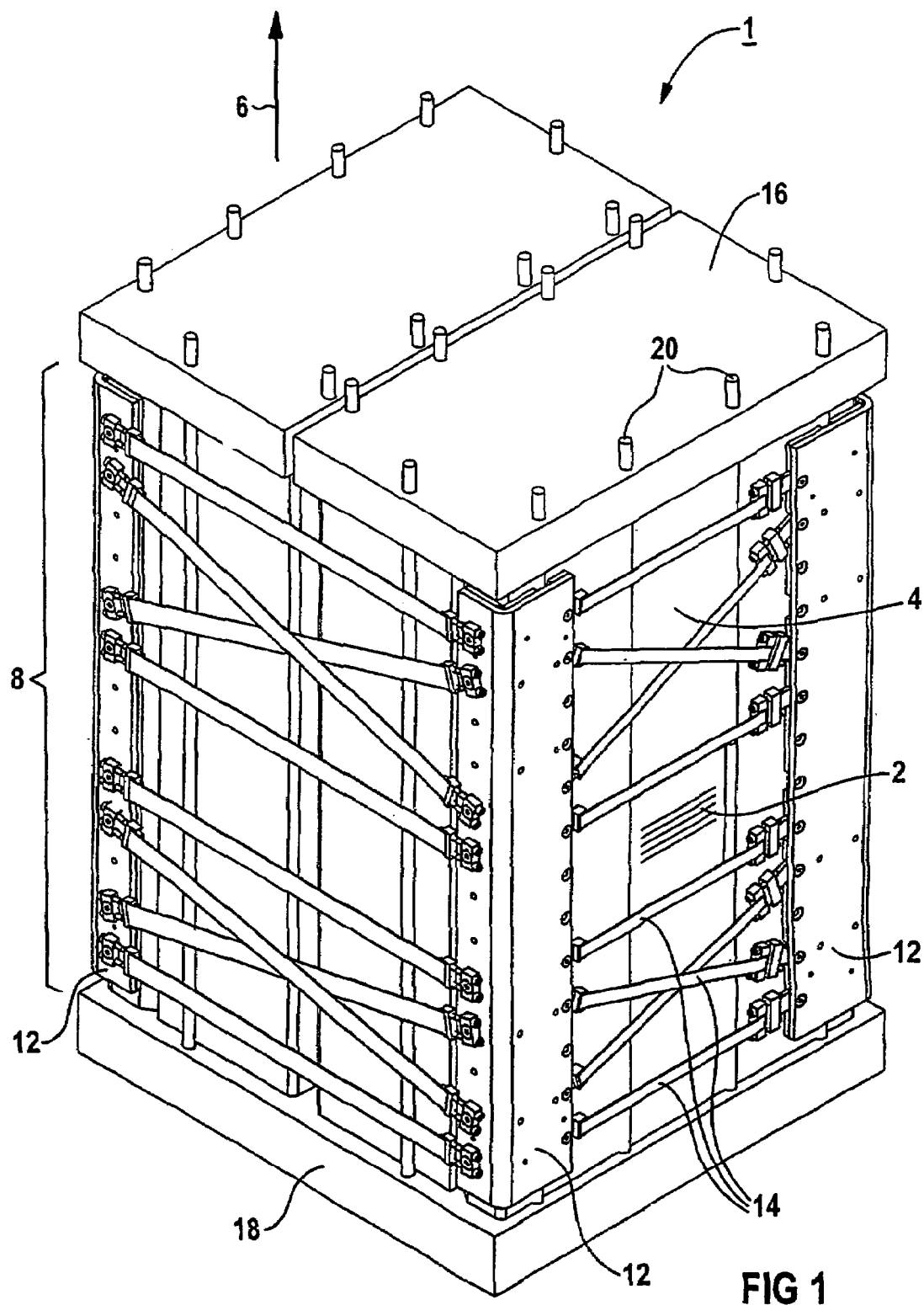
FIG. 1 shows a side view of a fuel cell module.

The fuel cell module 1 as shown in FIG. 1 includes a number of fuel cells 2, which are only indicated in the figure and are electrically series-connected. Each fuel cell 2, in a manner which is not illustrated in more detail, includes a sheet-like electrolyte which is covered over a large area on both sides by an electrode. The electrode has a number of passages passing through it in each case, via which a medium, in particular depending on the polarity of the corresponding electrode, a fuel which includes hydrogen or an auxiliary substance which includes oxygen, can be brought into contact with the electrolyte. For the electrical series connection, the fuel cells 2 are connected to one another in pairs by means of their electrodes, with the overall result being the formation of a fuel cell stack 4 in the manner of a layered structure.

To achieve sufficient operational reliability when the fuel cells 2 are operating, and in particular to produce a leaktightness, which is sufficient for operational reliability, at the seals which are arranged between each pair of adjacent fuel cells 2, it is intended for the fuel cell stack 4 to be operated under a certain axial pressure in its longitudinal direction, which is indicated by the arrow 6. However, the application of an axial pressure of this type in the longitudinal direction of the fuel cell stack 4 leads to the fuel cell stack 4 having a tendency to buckle, in particular on account of the elastic materials which are provided for the seal between each pair of fuel cells 2. In this context, the term buckling is to be understood as meaning in particular one or more fuel cells 2 shifting out of the central region of the fuel cell stack 4 in a direction perpendicular to the longitudinal direction represented by the arrow 6.

The tendency of the fuel cell stack 4 to buckle also increases, inter alia, as the number of fuel cells 2 connected in series increases. Therefore, the number of fuel cells 2 which can be connected in series to form the fuel cell stack 4 is essentially limited by the definition of a buckling tendency on the part of the fuel cell stack 4 which can still be considered tolerable for sufficient operational reliability.

To avoid this undesirable restriction in the flexibility of the fuel cell module 1 and to make it possible for any desired number of fuel cells 2 to be connected in series, in particular according to the corresponding design load, irrespective of the materials used when designing the fuel cells 2, the fuel cell module 1 is designed for a particularly high stability with respect to the abovementioned risk of lateral buckling. For this purpose, the fuel cell stack 4 is surrounded by a stabilizing casing 10 over a relatively large longitudinal region 8, as seen in its longitudinal direction represented by the arrow 6. The stabilizing casing 10 comprises a number of elements 12 which are matched in a positively locking manner to the outer contour of the fuel cell stack 4.

In the exemplary embodiment, the elements 12 are each designed as angle bars which can be placed against an outer edge of the fuel cell stack 4. Alternatively, it is also possible to provide elements which are designed as U-shaped metal sheets which are extended in the longitudinal direction of the fuel cell stack 4 and engage around the latter in cross section on one of its outer sides.

Each element 12 is connected to the elements 12 which adjoin it in each case by way of a number of connecting elements 14, which in the exemplary embodiment are designed as tensioning struts. Some of the connecting elements 14 are designed as pairs of connecting elements 14 which cross one another diagonally. On the other hand, other connecting elements 14 are designed as transverse struts which run on their own and are oriented substantially perpendicular to the longitudinal direction of the fuel cell stack 4 as indicated by the arrow 6.

The fuel cells 2 which lie on the outer sides, as seen in the longitudinal direction of the fuel cell stack 4, are each connected to a connection plate 16, 18.

The operating media can be fed to the fuel cells 2 which are connected up to form the fuel cell stack 4 via the connection plates 16, 18.

A number of tie rods 20 are formed integrally on each of the connection plates 16, 18 which are also known as terminal plates. The connection plates 16, 18 are clamped together, as seen in the longitudinal direction of the fuel cell stack 4, by way of the tie rods 20 and tensioning straps or tensioning devices which are attached to the tie rods and are not shown in more detail. This clamping leads to a pressure being exerted on the fuel cells 2 and the sealing elements fitted between them in the axial direction or longitudinal direction of the fuel cell stack 4. Therefore, this arrangement makes the fuel cell module 1 particularly compact, so that it can be used as a portable unit.

Figure 2:
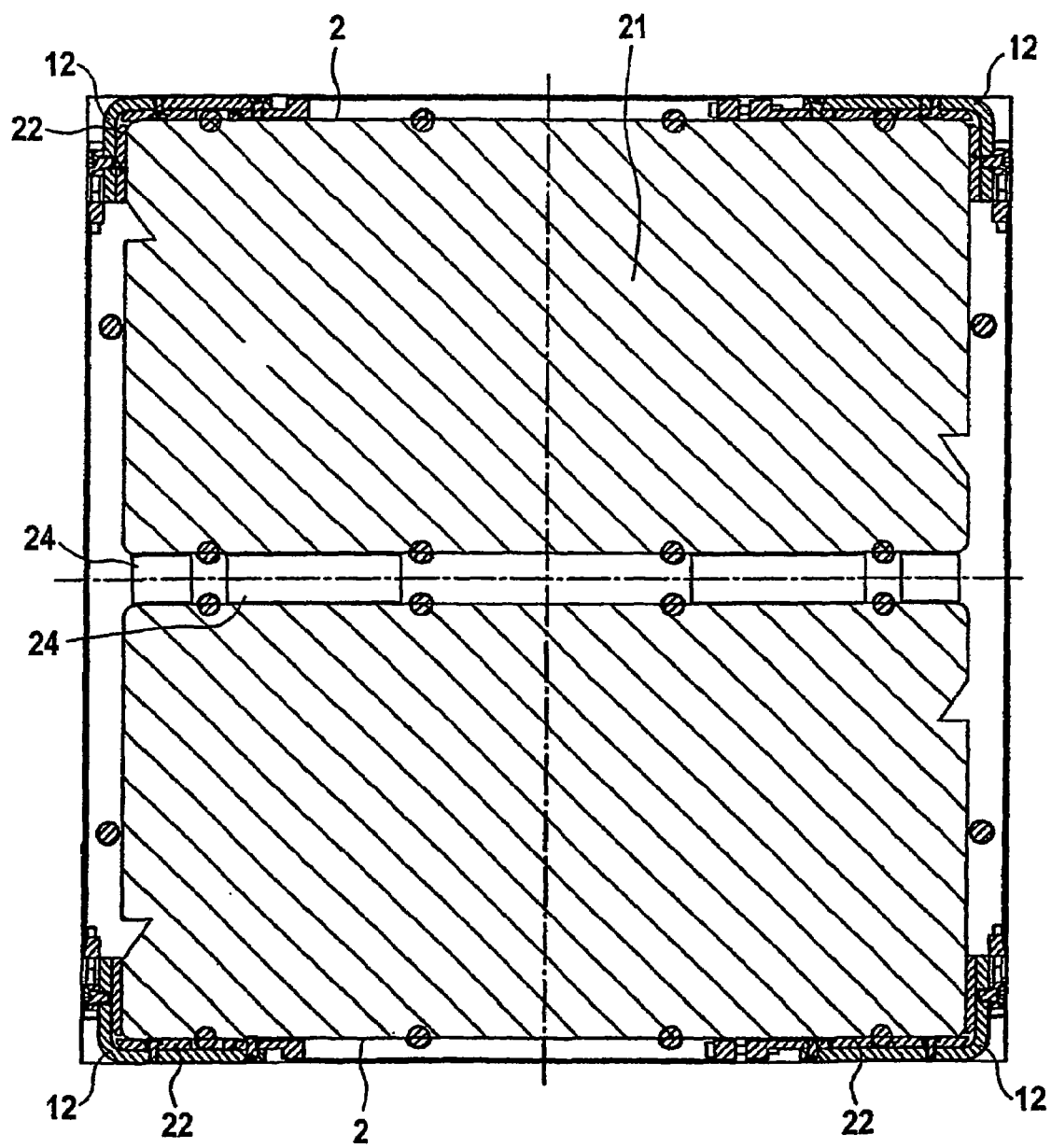
FIG. 2 shows a cross section through the fuel cell module as shown in FIG. 1.

FIG. 2 shows the fuel cell module 1 in cross section. The figure shows a plan view of two adjacent fuel cells of the fuel cells 2 which form the fuel cell stack 4. Each of the fuel cells 2 has an electrode 21 which is of sheet-like design and can be brought into contact with a corresponding electrode of a fuel cell 2 which adjoins it in the stack direction, so that the fuel cells 2 are connected in series. As can be seen from the cross section shown in FIG. 2, the fuel cell 2 and therefore the fuel cell stack 4 which it forms is surrounded by the elements 12 in the edge regions. A number of insulating elements 22 are in each case arranged between the elements 12 and the fuel cell 2. The insulating elements 22 ensure that the actual potential-carrying fuel cells 2 are in electrical terms completely decoupled from the elements 12. Consequently, the elements 12 can be grounded, so that the fuel cell module 1 has a particularly high operational reliability.

Between the two fuel cell stacks 4 there are electrically insulating spacers 24 which hold the two stacks at a predetermined distance from one another. The spacers 24 are designed as bars which are rectangular in cross section and are arranged along the entire fuel cell stack 4. It is equally possible for the spacers to be formed as smaller cuboids which in each case only space apart two or a small number of fuel cells 2. The spacers 24 are very stable and simple to produce and assemble if they are made from a part of the seal of a fuel cell 2. The spacers then form an integral part of the seal and therefore of the fuel cell 2.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A fuel cell module, comprising:
   a plurality of fuel cells connected in series form a fuel cell stack; and
   a stabilizing casing surrounding the fuel cell stack in its longitudinal direction,
   the stabilizing casing including a plurality of elements, matched in a positively locking manner to an outer contour of the fuel cell stack, wherein each of the elements extending in the longitudinal direction of the fuel cell stack contacts at least two sides of the fuel cell stack.

2. The fuel cell module as claimed in claim 1, wherein the plurality of elements include angle bars, adapted to be placed against an outer edge of the fuel cell stack.

3. The fuel cell module as claimed in claim 1, wherein the plurality of elements include at least one U-shaped metal sheet, extended in the longitudinal direction of the fuel cell stack and engaging around the fuel cell stack in cross section on one of its outer sides.

4. The fuel cell module as claimed in claim 1, wherein each element is connected to the elements which adjoin it by way of a plurality of connecting elements.

5. The fuel cell module as claimed in claim 4, wherein the connecting elements are designed as at least one of tensioning struts and tensioning straps.

6. The fuel cell module as claimed in claim 1, wherein each element is provided with a plurality of insulating elements on its side which faces the fuel cell stack.

7. The fuel cell module as claimed in claim 1, wherein the fuel cells which lie on the outer sides, as seen in the longitudinal direction of the fuel cell stack, are each connected to a connection plate.

8. The fuel cell module as claimed in claim 7, wherein a plurality of tie rods are arranged on each connection plate.

9. The fuel cell module as claimed in claim 8, wherein the connection plates are clamped together in the longitudinal direction of the fuel cell stack, via tensioning devices adapted to engage on the tie rods.

10. The fuel cell module as claimed in claim 1, comprising at least two fuel cell stacks, arranged adjacent to but offset from one another perpendicular to the stack direction, inside the stabilizing casing.

11. The fuel cell module as claimed in claim 10, comprising an electrically insulating spacer arranged between the two stacks.

12. The fuel cell module as claimed in claim 11, wherein a seal of one of the fuel cells is used as the spacer.

13. The fuel cell module as claimed in claim 2, wherein the plurality of elements include at least one U-shaped metal sheet, extended in the longitudinal direction of the fuel cell stack and engaging around the fuel cell stack in cross section on one of its outer sides.

14. The fuel cell module as claimed in claim 2, wherein each element is connected to the elements which adjoin it by way of a plurality of connecting elements.

15. The fuel cell module as claimed in claim 3, wherein each element is connected to the elements which adjoin it by way of a plurality of connecting elements.

16. The fuel cell module as claimed in claim 2, wherein each element is provided with a plurality of insulating elements on its side which faces the fuel cell stack.

17. The fuel cell module as claimed in claim 3, wherein each element is provided with a plurality of insulating elements on its side which faces the fuel cell stack.

18. The fuel cell module as claimed in claim 4, wherein each element is provided with a plurality of insulating elements on its side which faces the fuel cell stack.

19. The fuel cell module as claimed in claim 5, wherein each element is provided with a plurality of insulating elements on its side which faces the fuel cell stack.

20. The fuel cell module as claimed in claim 1, comprising at least two fuel cell stacks, arranged adjacent to but offset from one another perpendicular to the stack direction, inside the stabilizing casing.

21. The fuel cell module as claimed in claim 20, comprising an electrically insulating spacer arranged between the two stacks.

22. The fuel cell module as claimed in claim 21, wherein a seal of one of the fuel cells is used as the spacer.

23. The fuel cell module as claimed in claim 2, comprising at least two fuel cell stacks, arranged adjacent to but offset from one another perpendicular to the stack direction, inside the stabilizing casing.

24. The fuel cell module as claimed in claim 23, comprising an electrically insulating spacer arranged between the two stacks.

25. The fuel cell module as claimed in claim 24, wherein a seal of one of the fuel cells is used as the spacer.

26. A fuel cell module, comprising:
a plurality of fuel cells connected in series form a fuel cell stack; and
a stabilizing casing, surrounding the fuel cell stack at least in a middle area as seen in a longitudinal direction of the fuel stack,
the stabilizing casing including a plurality of elements, matched in a positively locking manner to an outer contour of the fuel cell stack, wherein each of the elements extending in the longitudinal direction of the fuel cell stack contacts at least two sides of the fuel cell stack.

27. The fuel cell module as claimed in claim 26, wherein the plurality of elements include angle bars, adapted to be placed against an outer edge of the fuel cell stack.

28. The fuel cell module as claimed in claim 26, comprising at least two fuel cell stacks, arranged adjacent to but offset from one another perpendicular to the stack direction, inside the stabilizing casing.

29. The fuel cell module as claimed in claim 28, comprising an electrically insulating spacer arranged between the two stacks.

30. The fuel cell module as claimed in claim 29, wherein a seal of one of the fuel cells is used as the spacer.

* * * * *